United States Patent [19]

Kessener et al.

[11] Patent Number: 4,749,126

[45] Date of Patent: Jun. 7, 1988

[54] LIQUID OUTLET ADAPTED TO PROVIDE LIGHTING EFFECTS AND/OR FOR ILLUMINATION

[76] Inventors: H. P. M. Kessener, Van Slichtenhorststr. 13, 6524 JH Nymegen; G. J. C. L. Bruls, Van Somerenstraat 26, 6521 BS Nijmegen, both of Netherlands

[21] Appl. No.: 822,417

[22] PCT Filed: May 6, 1985

[86] PCT No.: PCT/EP85/00202

§ 371 Date: Dec. 30, 1985

§ 102(e) Date: Dec. 30, 1985

[87] PCT Pub. No.: WO85/05167

PCT Pub. Date: Nov. 21, 1985

[30] Foreign Application Priority Data

May 9, 1984 [NL] Netherlands .......................... 8401479
Mar. 18, 1985 [AU] Australia .............................. PG9786

[51] Int. Cl.[4] ............................................. F21P 7/00
[52] U.S. Cl. ........................................ 239/12; 239/18; 362/96; 362/101

[58] Field of Search ........................... 239/18–20, 239/590, 289, 12; 362/96, 101, 154, 267

[56] References Cited

U.S. PATENT DOCUMENTS

| | | | |
|---|---|---|---|
| 1,626,037 | 4/1927 | Holt | 239/18 |
| 1,839,994 | 1/1932 | Proffatt | 239/18 |
| 2,034,792 | 3/1936 | Bergman | 239/18 |
| 2,623,367 | 12/1952 | Morrison | 239/18 |
| 3,702,172 | 11/1972 | Hawkins | 239/18 |
| 3,866,832 | 2/1975 | Noguchi | 239/18 |

FOREIGN PATENT DOCUMENTS

2099125 12/1982 United Kingdom ................. 239/18

Primary Examiner—Andres Kashnikow
Attorney, Agent, or Firm—John P. Snyder

[57] ABSTRACT

Spectacular display of lighting is effected by guiding light through a stream of non-turbulent water issuing into ambient atmosphere and directed to illuminate an object and/or turbulent water. The guided light is efficiently concentrated on the object and/or the turbulent water.

11 Claims, 16 Drawing Sheets

LIQUID OUTLET ADAPTED TO PROVIDE LIGHTING EFFECTS AND/OR FOR ILLUMINATION

BACKGROUND AND BRIEF SUMMARY OF THE INVENTION

This invention relates to liquid outlets. The liquid outlets with which the invention may be associated (but is not to be limited to) may include fountain nozzles, water faucets including domestic water faucets, hose nozzles and the like.

It is an object of this invention to provide liquid outlets whereby the fluid stream provides a source of illumination.

In relation to water fountains it is known to illuminate such water fountains whereby the illumination is by means of reflection from light sources which are generally hidden from view and are directed onto the water jets. While such illumination effects can be quite effective the available light is not used effectively since the visual effect results from that light which is reflected from the water jets to the eye and much of the light is either transmitted past the jets or through the jets. In addition since the light sources must be located around or closely adjacent to the water jets it is often the case that from particular positions around the fountain an observer is dazzled by the lights which impairs the view of the fountain.

Several alternatives to the conventional fountain have been proposed in the past whereby the water is caused to pass into a chamber from which it passes directly into the fountain stream and light is projected from the exterior of the chamber towards the outlet. Examples of such prior art is disclosed in U.S. Pat. No. 1,839,994 and French Pat. Specification No. 1.187.689. In each of these instances however the light source is located outside the fluid stream and light is shone into a housing through which the fluid flows on its way to the outlet. These arrangements are clumsy and bulky and there is considerable light loss due to transmission losses between the light entering the chamber and transmission of the light through the chamber to the outlet due to dispersion, reflection and refraction.

It is an object of this invention to provide a liquid outlet whereby light can be introduced into a fluid stream at the outlet, in order that maximum light input is effected with a minimum of losses.

In one form the invention resides in a liquid outlet comprising a housing connected to a source of liquid having an outlet capable of producing a substantially non-turbulent and/or low turbulent stream of liquid at said outlet for a distance beyond said outlet and a light source to introduce light into the stream at the outlet.

In one preferred form of the above invention the light source comprises a lamp located within said housing and supported in a holder which is in heat exchange relationship with the liquid flowing through the housing.

According to a preferred feature of the invention the light source is optically coupled to the outlet.

According to a preferred feature of the above feature the lamp is located adjacent the outlet.

According to a further preferred feature of the invention the light source is located remote from the outlet and a light guide provides the optical coupling between the light source and outlet.

It is the aspect of the invention to eliminate some of the disadvantages referred above in relation to fountains in that it provides for means whereby the fluid stream of the fountain serves as a light guide to deliver light to the portion of the stream at which the stream becomes significantly turbulent or disperses and whereby light is transmitted to the observer by multiple and variable refractions at the liquid/air and/or air/liquid boundary surfaces.

In addition the invention provides a means whereby a surface may be illuminated by having a liquid stream directed at a surface whereby the light is reflected by the surface at the point of impact of the logical stream.

The invention will be more fully understood in the light of the following description of several specific embodiments. The description is made with reference to the accompanying drawings of which:

BRIEF DESCRIPTION OF THE DRAWINGS

FIGS. 12c, 12d and 12e illustrate another liquid outlet according to the ninth embodiment of the invention;

Figure 1:
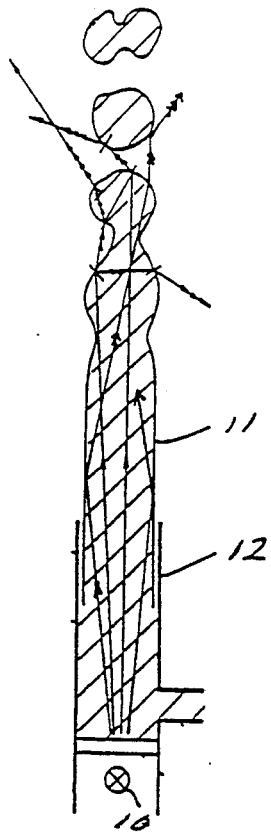
FIGS. 1, 2a and b, and 3 illustrate the optics associated with the invention.
Figure 2A:
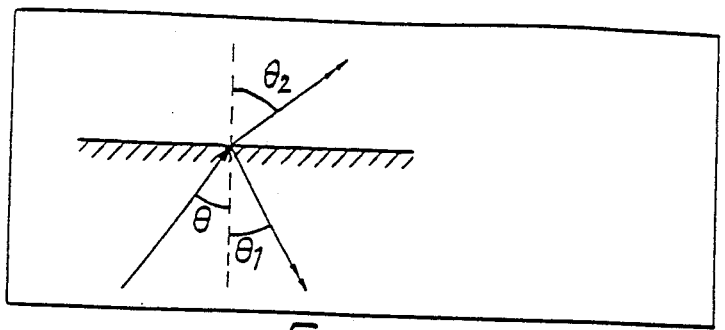
Figure 2B:
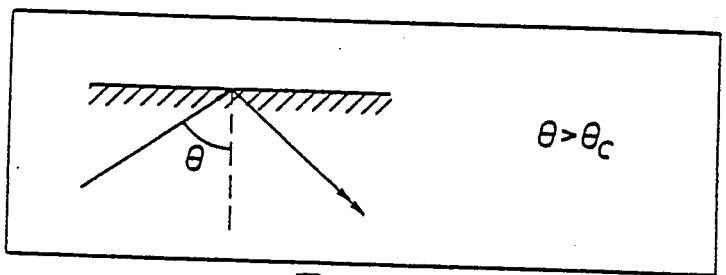

The principle on which the invention of each of the embodiments thereof relies relates to the total internal reflection of light on its passage from a medium of high refractive index to a medium of lower refractive index at the boundary between the two media provided the angle of incidence is greater than or equal to the critical angle for such media. Even where the angle of incidence is less than the critical angle there will also be a degree of reflection of the light back into the medium rather than passage beyond the boundary. Each of these phenomena are illustrated at FIGS. 2a and 2b. Where the light is projected from a light source into a stream of water 11 issuing from a nozzle 12 predominantly most of the light will be totally internally reflected within the column until such time as turbulence is introduced into the column at which time the light will be caused to pass from the column causing the turbulent portion of the column to emit light. As shown at FIG. 1 as a result of the column of water or jet of water functions as a light guide provided the boundary conditions between water and air are such as to allow total internal reflection light being transmitted through the column. In addition the jet of water itself may become visible due to the presence of foreign particles in the water, bubbles or the like as is pointed out by arrow A in FIG. 3.

Figure 3:
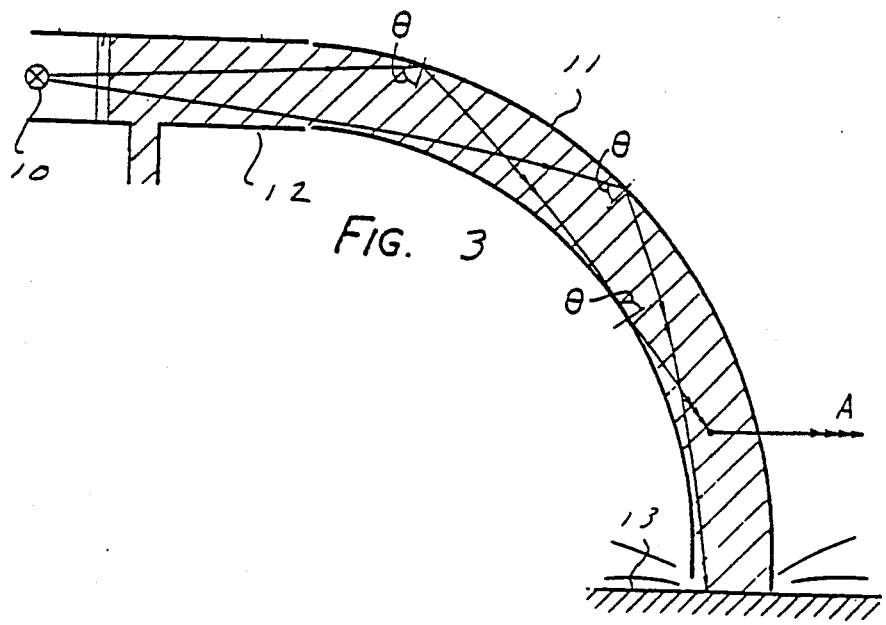

As shown at FIG. 3 where a substantially non-turbulent stream of liquid 11 issues form a nozzle 12 and strikes a surface 13 the area of impact of the jet will be illuminated producing a spectacular display.

It is the spectacular nature of the visual effects produced by the light within the column of water and its eventual escape therefrom that is the object of each of the embodiments described below.

Figure 4:
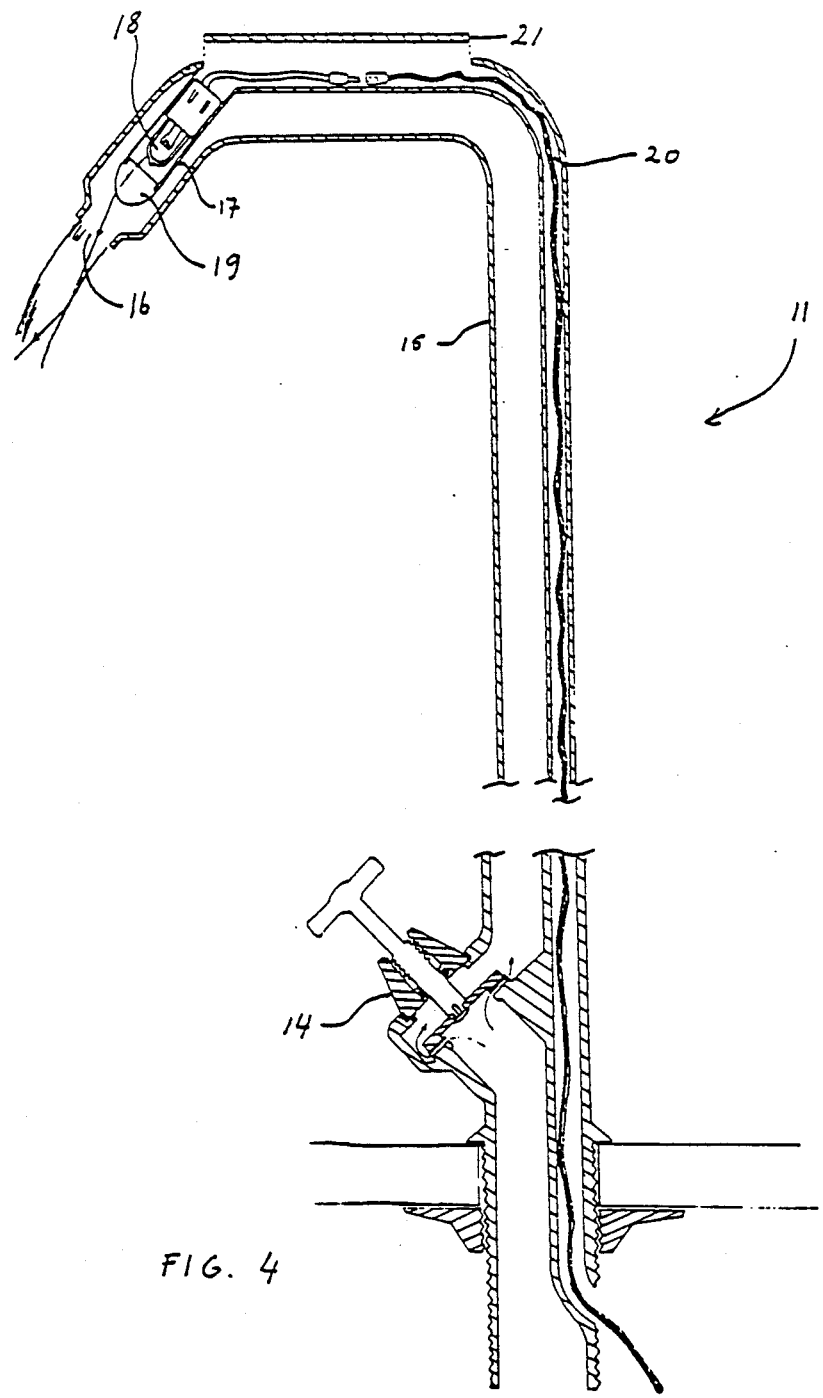
FIG. 4 illustrates a domestic faucet incorporating the first embodiment.

The first embodiment shown at FIG. 4 comprises a water faucet 11 controlled by a tap 14 and having an extended water delivery nozzle 15 with an outlet 16. The interior of the nozzle 15 accommodates a lamp housing 17 adjacent the outlet 16 which supports a halogen-quartz lamp 18, the transparent outer end 19 of the lamp housing 17 adjacent the outlet 16 is formed hydro-dynamically to avoid the creation of turbulence associated with cavitation (which will cause light from lamp 18 to be dispersed, whence less light will reach outlet 16) in the fluid flow passing through the nozzle 15 to the outlet 16 past the lamp housing 17. In addition the formation of the outer end of the lamp housing to avoid such turbulence creates a condenser lens 19 which serves to focus the light issuing from the lamp housing. Moreover, lamp housing 17 and fluid stream will be in heat-exchange relationship, whereby sufficient cooling of the lamp housing is guaranteed.

The lamp housing 17 may be fitted with reflective surfaces on the inside, in order to maximise light output towards fluid outlet 16. The nozzle 15 is formed with a channel 20 which extends substantially the full length of the nozzle and opens at a position which would be normally out of view to allow for the accommodation of electrical cables for the lamp 18. The portion of the channel 20 adjacent the lamp housing 17 is increased in its lateral dimension and is associated with a closure 21 to provide access to the rear of the lamp housing for replacement of the lamp 18. The activation of the lamp 18 is effected by a control which is sensitive to the operation of the tap 14 to effect flow of water through the nozzle 15 or alternatively a flow sensitive member located in the water stream.

When the jet, leaving such fluid outlet, has an irregular surface, light will emerge from the jet along its length at those points where internal reflection is not total. Hereby the fluid stream (water stream) achieves an increased visibility, which, apart from esthetic effects, can be of advantage in situations where illumination is poor or when an increased visibility of the fluid jet is desired. Whenever the jet has a very smooth boundary surface, conditions for total internal reflection are met all along the fluid stream, hereby the presence of light will not become apparent and the jet will have a normal clear aspect, until after the stream has been rendered turbulent or strikes a surface.

Also, when the continuity of such smooth, normal looking but light-conducting jet, is disrupted over a very short distance, for instance by rapidly moving an object (e.g. a piece of wire) through the jet at right angles to the jet, light will emanate from the jet at this discontinuity, which discontinuity will then become visible and appear as a blob of light. As the discontinuity moves along the jet at the speed of the liquid in the jet, this blob of light will appear to be moving along the jet, thus providing a spectacular effect. Means may be provided to disrupt the continuity of such light-conducting jets according to certain time-patterns.

When a smooth, normal looking, but light-conducting, jet is directed downward, the diameter of the jet will decrease as function of its length, as the velocity of the liquid in the jet will increase due to gravity, thus concentration of the light contained in the jet occurring, until cohesive forces of the molecules of the liquid will cause the jet to break up into drops. In this region of the jet, all light, now concentrated in the thin jet just before it breaks up, will leave the jet and radiate intensely to the surroundings, providing for a very bright effect.

However, any particle of foreign matter, either colored, fluorescent, or having any other properties, or air or gas bubble, contained in the fluid flowing from the nozzle 15 will scatter light that is within the jet, which light may hit the surface of the jet at angles smaller than the critical angle, and thus become visible.

In both cases above, i.e. the irregular, bright-looking jet, and the smooth, normal looking jet, light is present within the jet. As a result when filling a receptacle with such fluid jet, light will spread inside the receptacle, thereby illuminating the receptacle from the inside which in general facilitates inspection, while a spectacular effect is provided when a transparent receptacle such as a glass is being filled from the nozzle.

Figure 5:
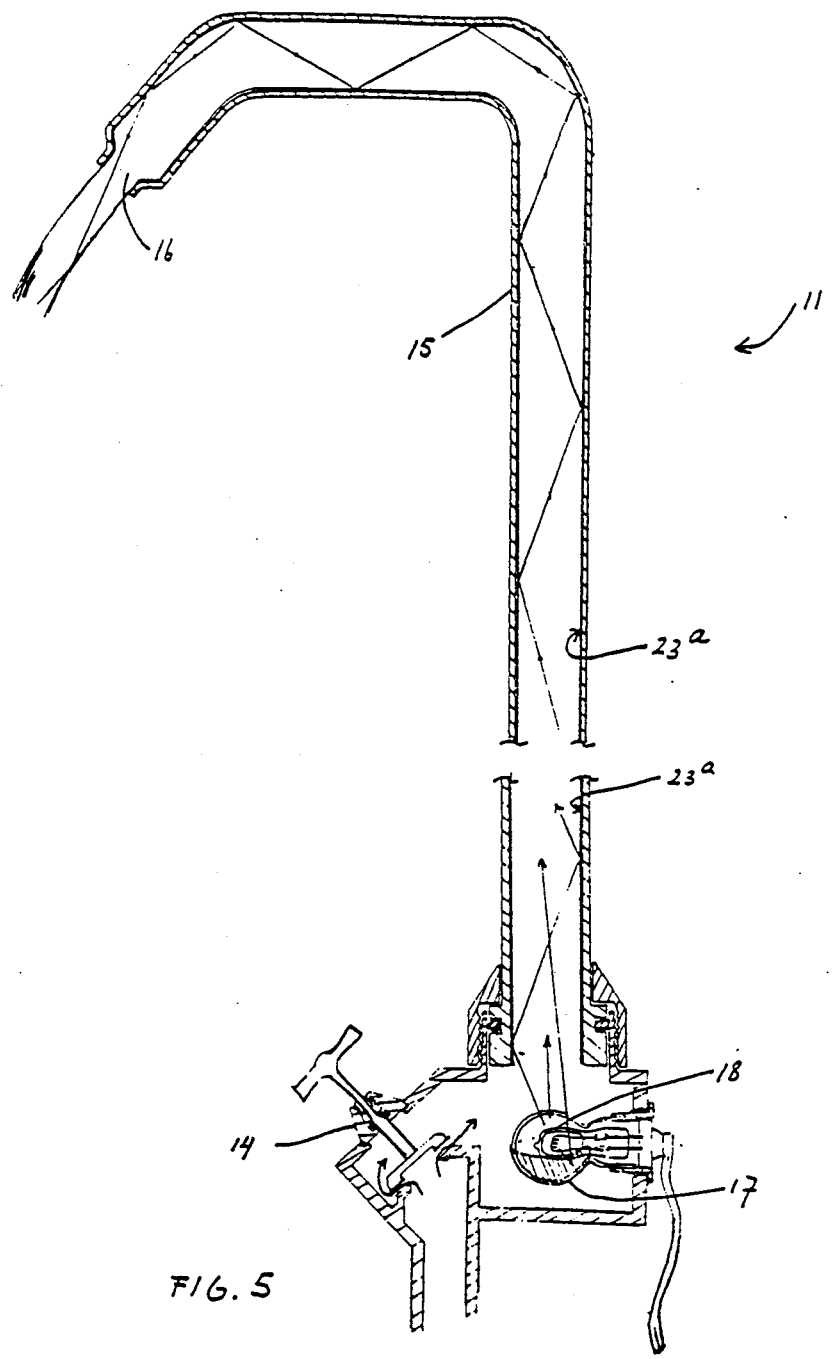
FIG. 5 illustrates a domestic faucet incorporating the second embodiment.

The second embodiment of FIG. 5 also relates to a water faucet 11 operated by a valve 14 having a nozzle 15 formed with an outlet 16. An intermediate chamber is located between the outlet of the tap 14 and the lower end of the nozzle 15 and accommodates a lamp housing 17 having a window directed towards the lower end of the nozzle 15. The lamp housing 17 accommodates a halogen lamp 18 which housing 17 is in heat exchange relationship with the fluid in the intermediate chamber 22, and which directs light into the lower end of the nozzle 15, the interior surface of which is formed to be smooth and made reflective by a reflective coating 23a. As with the first embodiment the operation of the lamp 18 is effected through a switch associated with the tap 14, a pressure-or flow-sensitive switch or an electronic switching device in the water stream. Due to the reflective nature of the interior of the nozzle and the substantially parallel configuration of the side walls and nozzle 15 serves as a light guide which provides optical coupling between a lamp 18 and the outlet 16.

Figure 6:
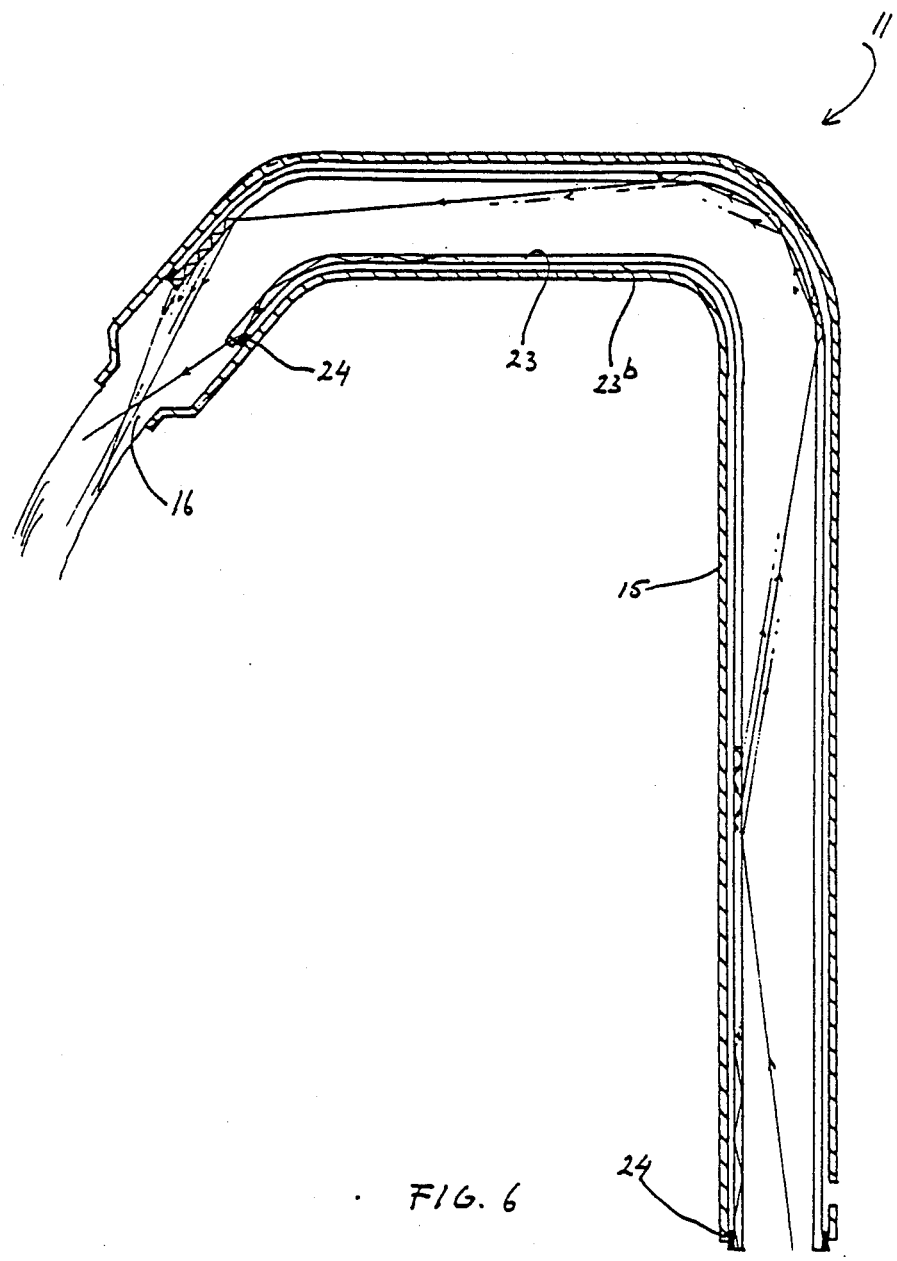
FIG. 6 illustrates the third embodiment of the invention.

The third embodiment of FIG. 6 relates to a faucet similar to the form of the second embodiment of FIG. 5 except that the interior of the nozzle 15 is formed for a significant portion of the distance between the chamber 22 and the outlet 16 by a tubular liner 23 which is formed of a transparent material such as polymethyl methacrylate. The exterior face of the liner is spaced from the internal wall of the housing to form an air gap 23b therebetween and suitable sealing means 24 is provided at either end of the liner to prevent the entry of fluid into that space. The light from the lamp 18 is optically coupled with the outlet 16 by the light guide which is formed by the tubular liner and the water being conducted therethrough. The light on its passage through the nozzle 15 is partially reflected by the internal surface of the tubular liner 23, and partially refracted into the wall of the tubular liner 23, which portion of light will undergo total internal reflection at the external surface of the tubular liner when the angle of incidence onto that surface is greater than the critical angle. Light reflected from that surface will strike again the internal surface of the tubular liner, and be refracted as well as reflected, or undergo total internal reflection.

Thus, the tubular liner serves as a hollow light guide, whereby light is conducted in the wall of the tubular liner as well as in the fluid conducted herethrough.

The tubular liner 23 may be coated with a transparent material having an index of refraction lower than the hollow light guide, that does not depend on the presence of the air gap 23b.

Moreover, when the interior wall of nozzle 15 between chamber 22 and outlet 16 is covered with a transparent material having an index of refraction smaller than the index of refraction of the fluid it conducts, light will undergo total internal reflection at this surface whenever the angle of incidence is greater than the critical angle involved, thus, light from lightsource 18 will be conducted through the fluid to outlet 16.

An alternative form of the embodiment comprises exposing the tubular liner such that at least the free end portion of the liner is exposed. As a result when water is flowing from the nozzle the ends of the nozzle glow and may project some light onto the exterior of the jet of water.

Figure 7:
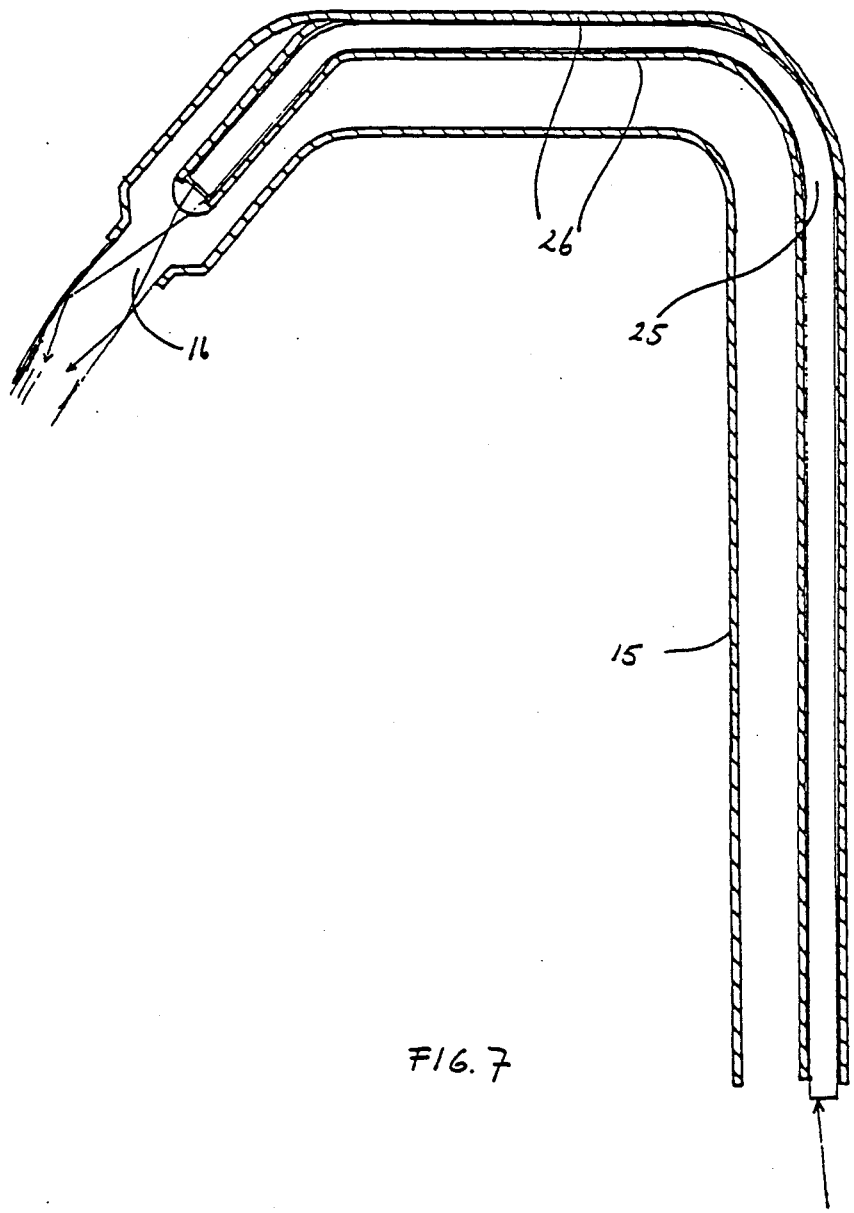
FIG. 7 illustrates a fourth embodiment of the invention.

The fourth embodiment of FIG. 7 also comprises a modification of the second embodiment of FIG. 5 whereby the light guide is a conventional flexible light guide consisting of glass fibres, synthetic fibres, or being fluid filled, is accommodated within a conduit (channel) 26 inside the nozzle 15.

The channel 26 may be closed sealingly to prevent entry of water into it.

If the conventional light guide is resistant to the influence of water, the channel 26 may be superfluous. The outer end of the channel 26 supports a closure which is hydro-dynamically shaped to prevent the production of turbulence and associated cavitation within the jet stream flowing from the outlet 16 and to provide a condensing effect for the light emanating from the light guide 25.

Figure 8:
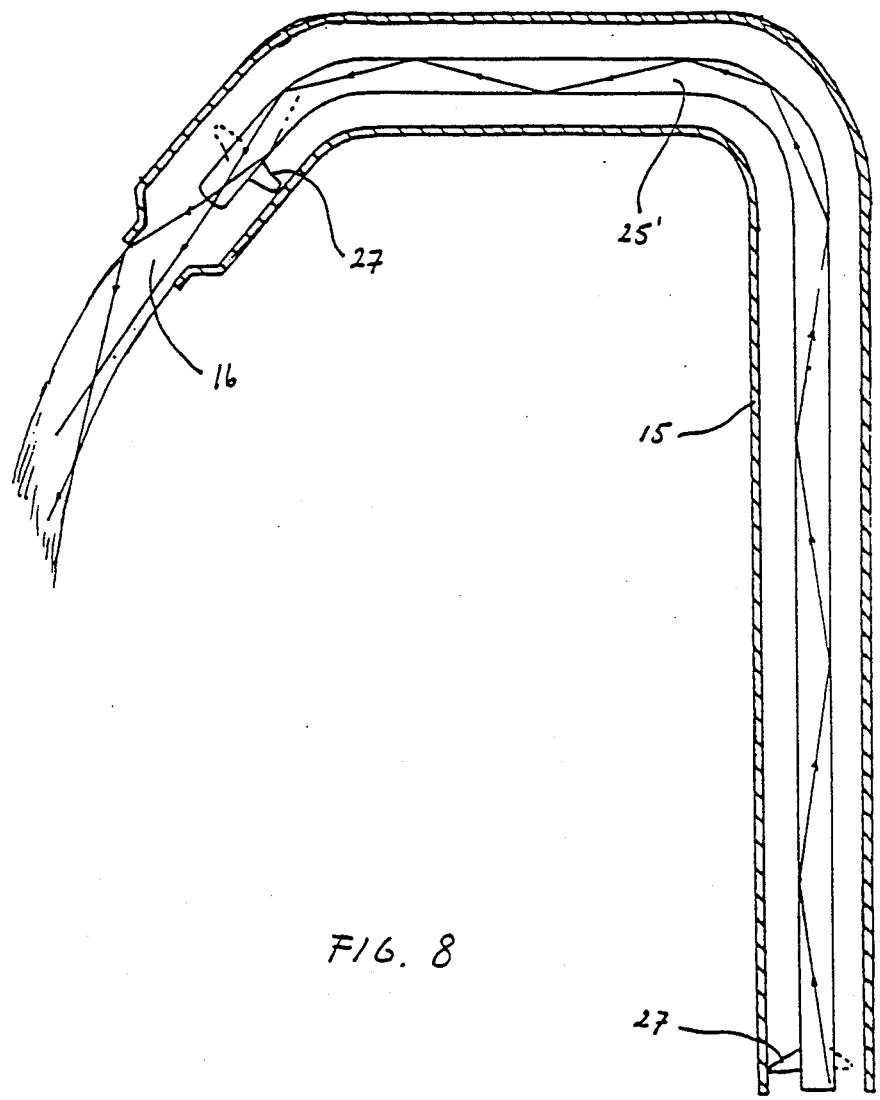
FIG. 8 illustrates a fifth embodiment of the invention.

The fifth embodiment of FIG. 8 is also a variation of the second embodiment of FIG. 5 whereby the light guide comprises a clear transparent rod 25 supported within the nozzle by spacer elements 27 at spaced intervals along its length and which extends between the lamp 18 (not shown) and the outlet nozzle 16. Here, the guiding of light is based on the difference of index of refraction between the material of the rod and the surrounding fluid, e.g. in case of polymethyl methacrylate and water being 1.49 and 1.33 respectively.

Figure 9A:
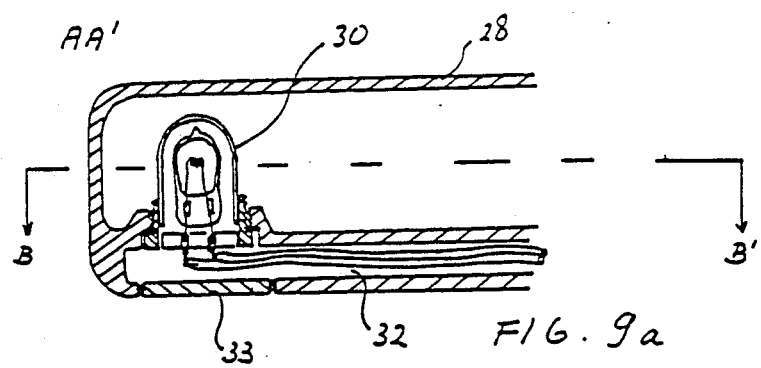
FIGS. 9a and 9b are a sectional plan view and an elevation of a sixth embodiment of the invention.
Figure 9B:
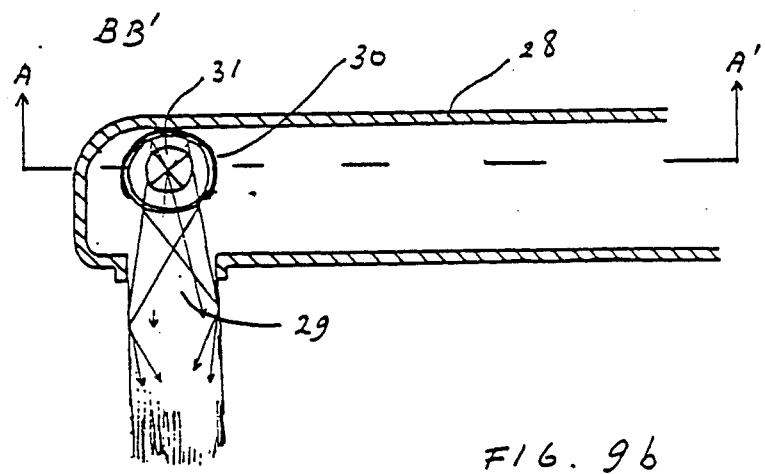

The sixth embodiment as shown at FIGS. 9a and 9b relates to a nozzle 28 having an outlet 29, that is directed more or less at right, angles in respect to the longitudinal axis of the nozzle, located more or less remote from the taps. The nozzle 28 supports a lamp housing 30 adjacent the outlet 29 and accommodates a lamp 31. The housing 30 is formed with a window directed at the outlet 29 while the remaining interior face of the housing 30 is rendered reflective to direct any light incident thereon to the window and thus to the jet stream 29. The operation of the lamp 31 is effected by operation of the taps associated with the nozzle 28 or a flow control switch, pressure sensitive switch or electronic switching device sensitive to the flow, pressure or presence of water through the nozzle or conduits connected thereto. The electrical cables for the lamp 31 are accommodated within a channel 32 located within the nozzle 28 while the wall of the channel opposite the lamp housing 30 is provided with a closure which facilitates access to the lamp for the replacement thereof.

Figure 10:
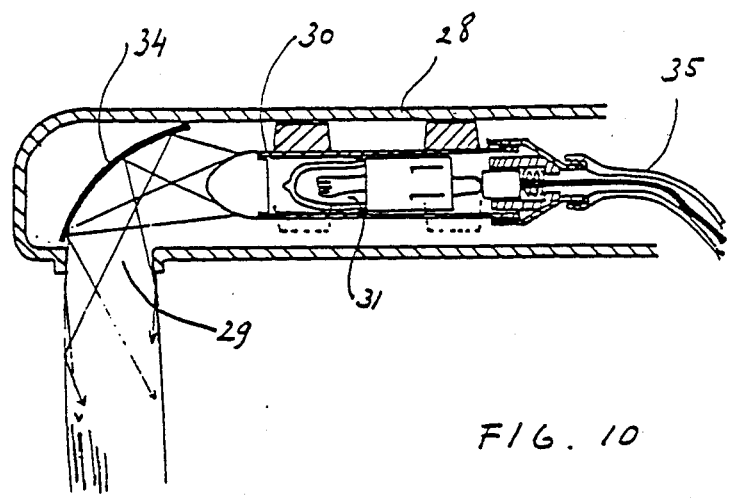
FIG. 10 illustrates a liquid faucet incorporating the seventh embodiment of the invention.

The seventh embodiment of FIG. 10 is a modification of the sixth embodiment of FIG. 9 whereby the lamp 31 is accommodated within a hydro-dynamically shaped housing 30 supported in spaced relation within the nozzle 28. The lamp is located closely adjacent a concave mirror 34 whereby light from the lamp which is incident on the mirror 34 is directed to the outlet 29. The electrical cable connected to the lamp 31 is accommodated within a flexible conduit extending through the nozzle 28, passing out of the nozzle at some suitable location out of view, and opening up to atmosphere. Due to the flexible nature of the conduit 35 and the direct relation with atmosphere, any pressure variations produced with the housing 31 and the conduit 35 by the presence or absence of fluid flow through the nozzle 28 and the heat produced by the light source may be readily accommodated.

Figure 11A:
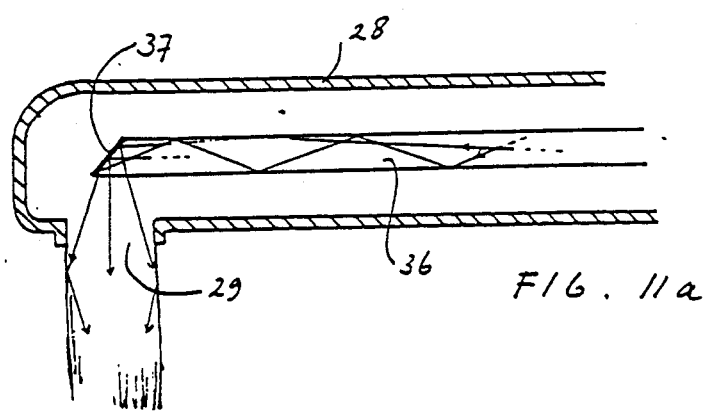
FIGS. 11a and 11b illustrate a faucet having two forms of the eighth embodiment of the invention.
Figure 11B:
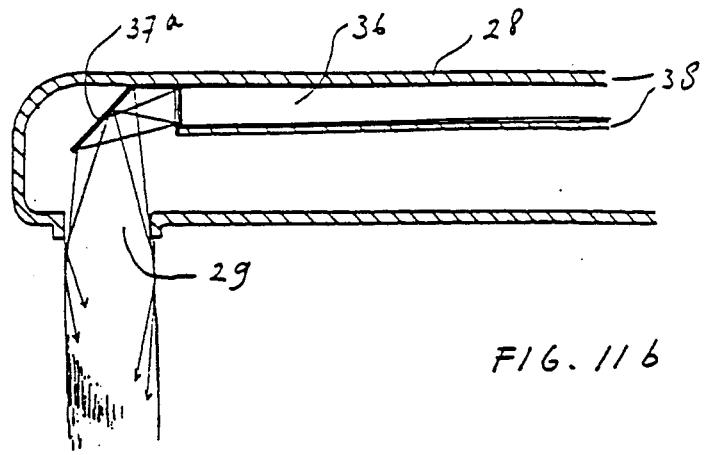

The eighth embodiment of FIGS. 11a and 11b is a further modification of the sixth embodiment of FIG. 9. The first form shown at FIG. 11a utilises a rod shaped clear transparent light guide 36, supported within the nozzle 20 by spacer elements (not shown), and is formed at its outer end with an oblique reflective face which reflects any light reaching the end of the light guide 36 towards the nozzle outlet 29. The form shown at 11b accommodates a conventional flexible light guide 36 within a sealed channel 38. A plane or concave mirror is located adjacent to the free end of the light guide 36 to direct any light emanating from the light guide to the nozzle outlet 29.

Again, the channel 38 is superfluous if the flexible light guide is resistant to the influence of the fluid.

Figure 12A:
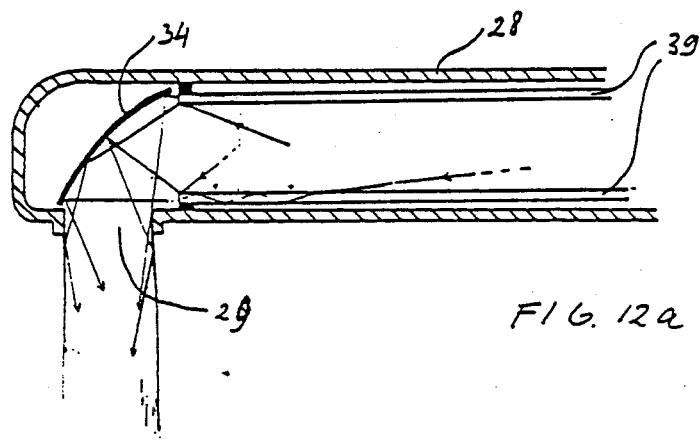
FIGS. 12a and 12b illustrate a faucet having two forms of the ninth embodiment of the invention.
Figure 12B:
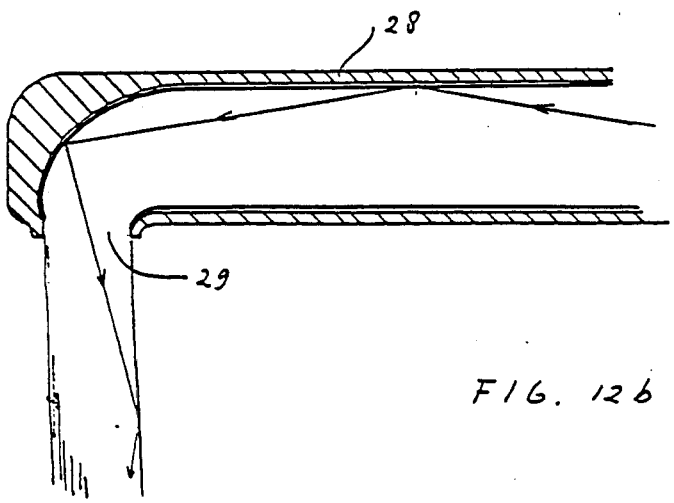

The ninth embodiment of FIGS. 12a and 12b comprise two forms which utilise the fluid being conducted by the nozzle 28 as the light conducting medium. In the case of the first form shown at FIG. 12a the interior of the nozzle 28 supports a tubular liner formed of a clear transparent material such as polymethyl methacrylate the external walls of which are spaced from the internal walls of the nozzle 28 and either end of the space so created is sealed to prevent the entry of any water. As in the case of the third embodiment of FIG. 6 light from a remotely located lamp (not shown) is conducted to the outer end of the nozzle by the water flowing through the nozzle and the walls of the tubular element. The outer end of the nozzle 28 supports a concave mirror which directs any light incident thereon which has passed through the nozzle 28 to the outlet 29. In the case of the second form of the embodiment the internal walls of the nozzle 28 are rendered smooth and reflective.

It should be appreciated that the nozzle outlets described untill now can take any form or shape, circular, oval, rectangular, elongated, etc. Thus, a particular embodiment, as shown in FIG. 12c and 12d, may have an elongated, slit-like outlet to produce a sheet of water, e.g. to be used as a waterfaucet controlled by taps remote from the outlet, or a fountain display.

Here again, the lamphousing 101 is in heat exchange relationship with the liquid, and light emanating from light source 107 is directed via window 102 into the fluid, entering the faucet via inlet 100 into intermediate chamber 105, towards outlet 103, in a direct manner and/or indirectly via the internal wall of the nozzle which is rendered reflective, into the fluid stream 104.

The window 102 may be hydrodynamically shaped to avoid creation of turbulance and associated cavitation. However, when the dimensions of the intermediate chamber 105 are large compared to the dimensions of the outlet 103, the velocity of the liquid in the intermediate chamber will be small, and the window does not necessarily have to be hydrodynamically shaped. Thus, the window 102 can be made hollow, as in FIG. 12e, such that light condensing effect is created by the liquid in the hollow 106 of window 102, while sufficient cooling is still guaranteed, and concentration of light directed towards the nozzle outlet is maximised.

Figure 12C:
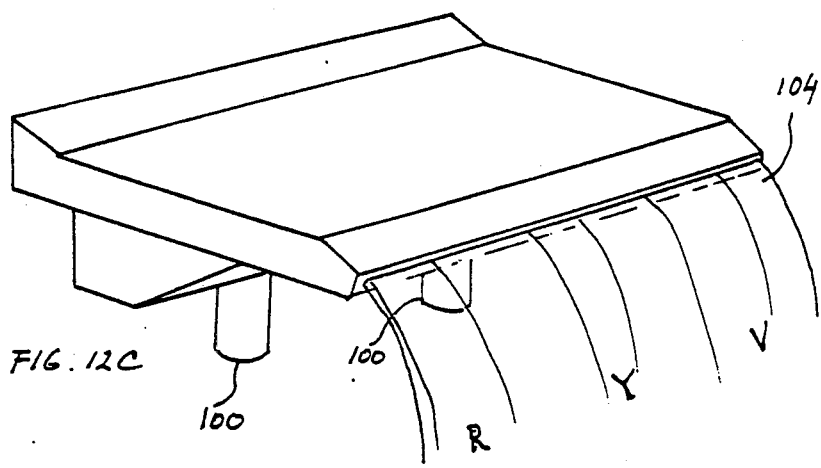
Figure 12C:
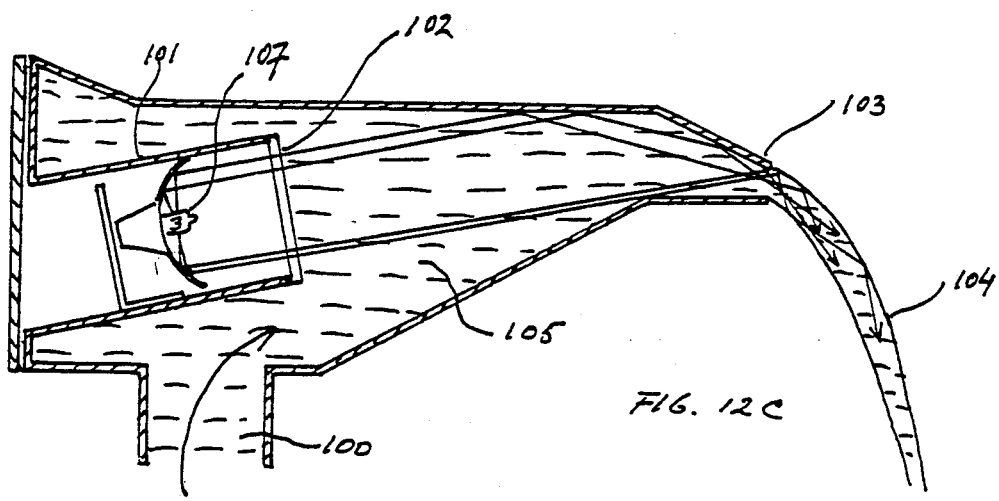
Figure 12D:
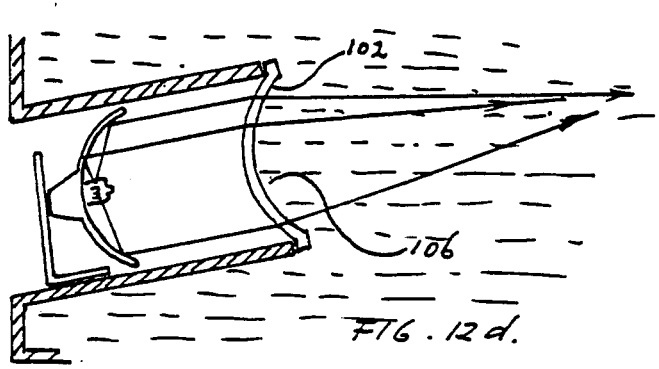

Alternatively, one or more prisms or optical grids may be positioned between lightsource and outlet at or near window 102, such that the sheet of water, being expelled from such elongated nozzle outlet, contains light of different colors at different positions along the length of the outlet, in the same order as occurs in a rainbow, as is pointed out by the characters R (red), Y (yellow), V (violet) in FIG. 12c.

Such watertap or faucet, or fountain, may be called appropriately a "rainbow"—tap, —faucet, or —fountain.

Naturally, colorfilters may be placed between the lightsource and the outlet in order to create any combination of colors of the light conducted in the jet.

Figures 13, 14:
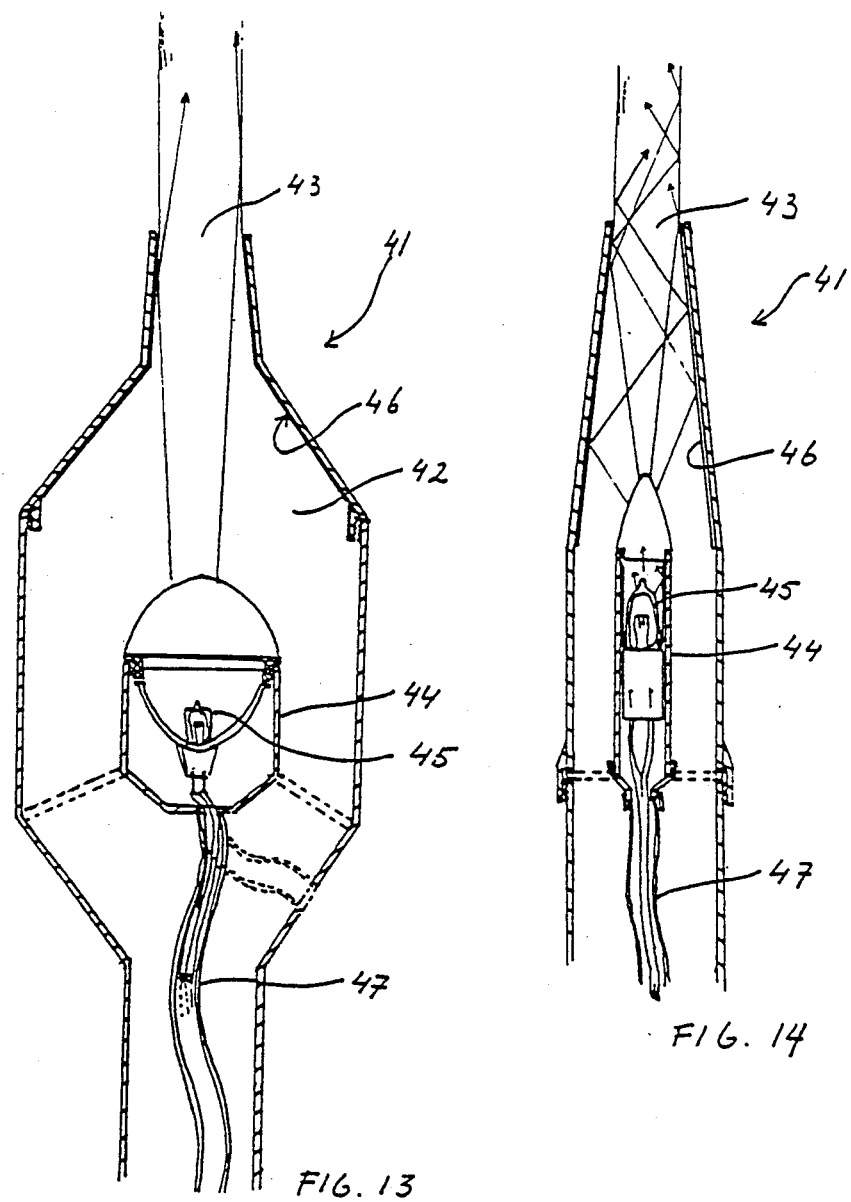
FIG. 13 is a sectional elevation of a fountain nozzle according to the ninth embodiment of the invention.
FIG. 14 is a sectional elevation of another form of fountain nozzle incorporating the eleventh embodiment of the invention.

The tenth embodiment of FIG. 13 is directed towards a fountain nozzle 41 having a chamber 42 located in the conduit immediately prior to the outlet 43 which supports a lamp housing 44 accommodating a lamp 45. The lamp housing 44 is hydro-dynamically shaped to avoid the creation of any turbulence in the fluid stream leaving the outlet and as a result the window of the lamp housing 44 created by such shaping serves as a condenser lens. The internal face of the chamber 42 beyond the lamp housing 44 is rendered reflective (e.g. by a coating 46) to ensure that any light incident thereon is directed to the outlet 43.

The eleventh embodiment of FIG. 14 is a variation of the tenth embodiment of FIG. 13 whereby the chamber 42 is eliminated by providing a lamp housing 44 of reduced dimensions, such that the nozzle may have a reduced cross-sectional diameter (20 mm or less), enabling long slender nozzles of any bend or curved form producing light conducting fluid jets, without any sign proving the presence of a light source being visible from the outside.

The tenth and eleventh embodiments of FIGS. 13 and 14 the electric cable for the lamp 45 are accommodated within a flexible conduit 47 extending through the water conduits providing the water supply for the fountain and exiting therefrom at some suitable location. The flexible nature of the conduit which opens to atmosphere at its outer end ensures that any pressure variations induced within the lamp housing 44 and the conduit 47 are accommodated.

Figure 15:
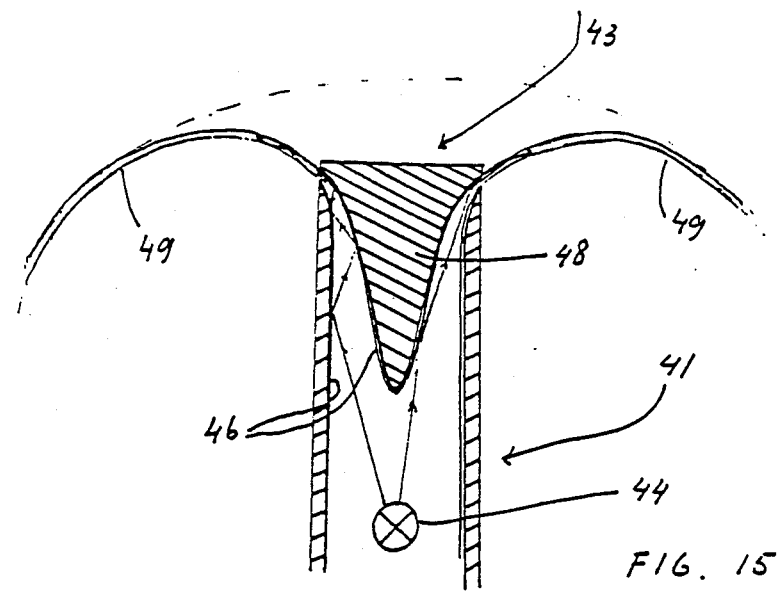
FIG. 15 is an elevation of another form of fountain nozzle incorporating the twelfth embodiment of the invention.

The twelfth embodiment of FIG. 15 relates to a fountain nozzle 41 in which a flow deflector 48 is located at the outlet 43 to provide a bell shaped fan 49. A lamp housing 44 accommodating a lamp (not shown) is located directly below the deflector and the interior walls of the nozzle and flow deflector of the region above the lamp housing 44 are reflective by a coating 46 and as a result the water departing the nozzle 41 serves as a light guide until the fan begins to break up at which point the light within the water becomes visible to produce a spectacular display.

Figure 16:
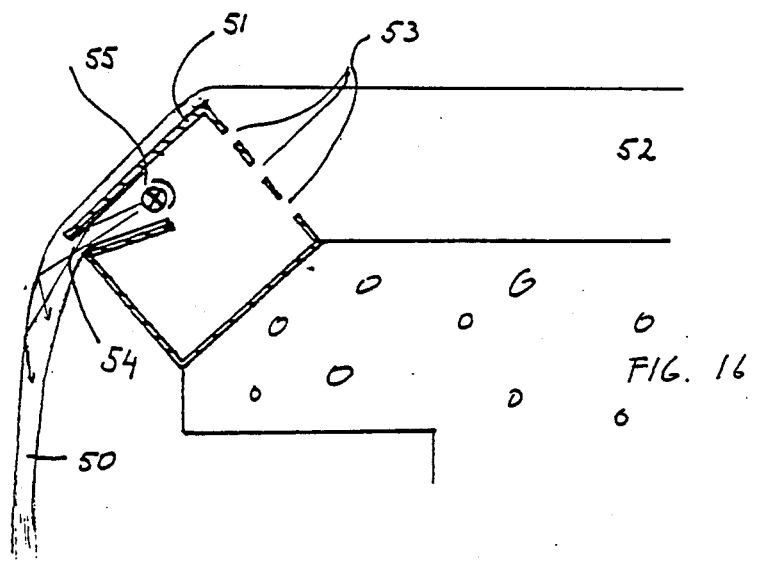
FIGS. 16 and 16b are sectional elevations of fountains comprising a descending stream of water incorporating the thirteenth embodiment of the invention.

The thirteenth embodiment of FIG. 16 relates to a fountain of the waterfall type whereby a sheet of descending water 50 is created by a dam 51 located to one side of a water reservoir 52. The dam is formed with apertures 53 on its inner face which permit the entry of the water into the interior of the dam and an outlet 54 at the upper end of its exterior face such that water flowing from within the dam merges with water flowing over the exterior surface of the dam to produce a non-turbulent stream of descending water 50. A lamp housing 55 is located adjacent the outlet 54 and is adapted to direct light emanating from the lamp at the outlet 54. Due to the non-turbulent nature of the descending sheet of water for at least a significant portion of travel below the dam 50 the light is entrapped in that sheet of water and is released when the flow is rendered turbulent or strikes a surface to produce a spectacular display.

Figure 16B:
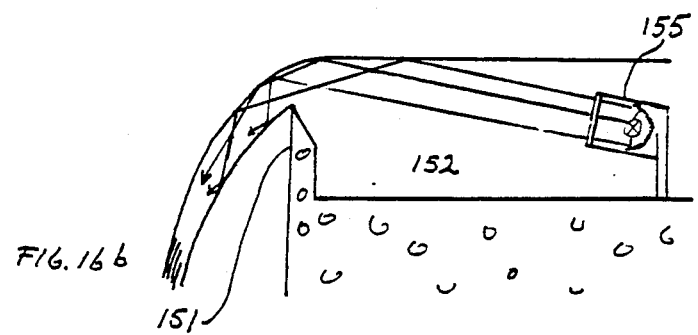

Alternatively, as shown in FIG. 16b, a sheet of descending water is created by a dam 151, and a lightsource in a housing 155 directs light from under the surface of the water in reservoir 152 towards the surface of the water near the brim of dam 151, preferably at an angle greater than the critical angle, which light will then undergo total internal reflection at that surface. Thus, a substantial part of that light will be entrapped in the descending sheet, providing for a spectacular display.

Figure 17:
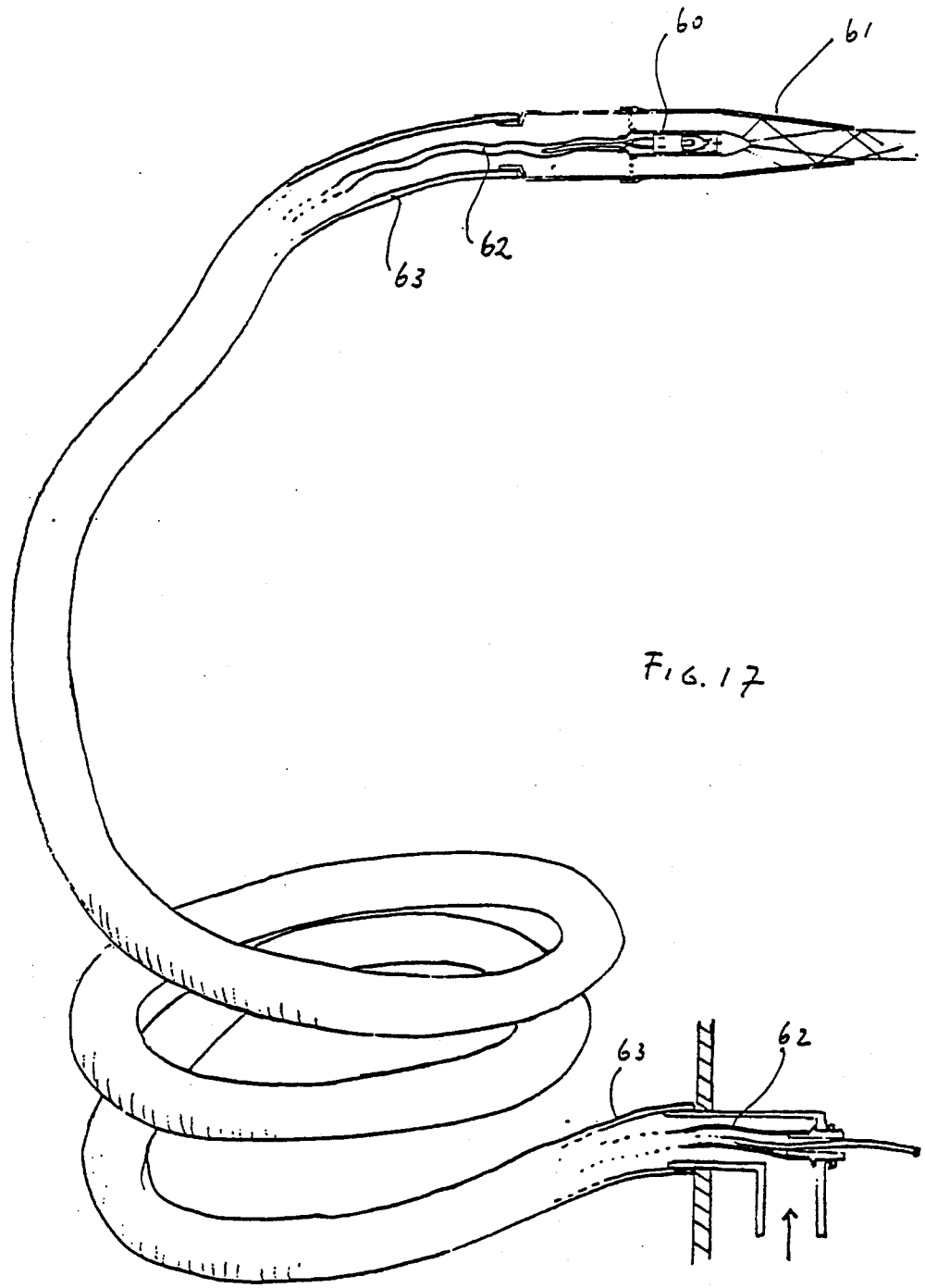
FIG. 17 is a view of the fourteenth embodiment of the invention.

The fourteenth embodiment of FIG. 17 relates to the incorporation of a lamp housing 60 within a hose nozzle 61 the interior walls of which beyond the lamp housing 60 may be rendered reflective. The electrical cables for the lamp within the lamp housing 60 are accommodated within a flexible conduit 62 which extends through the hose 63 connected to the nozzle 62 to exit from the water conduit to which the hose is connected at some suitable location. As a result of the embodiment a hose nozzle is produced which may be used to produce a spectacular display and/or to illuminate those items at which the water stream is being directed.

It should be appreciated that in the case of the embodiments of FIGS. 13, 14, 15, 16 and 17 the lamp housing may be replaced by a light guide extending from a remotely located lamp housing to the outlet whereby the lamp housing may be accommodated within the fluid stream at the remote location or separate from the fluid stream. The light guides described in relation to the embodiments of FIGS. 5 to 12 may be used in the embodiments of FIGS. 13 to 17.

In addition in relation to each of the embodiments, means such as is indicated at IM in FIG. 3 may be provided for introducing a controlled stream of air or gas bubbles, or any particles as dye particles, fluorescent or not, or with other characteristics into the stream of water. As a result, the bubbles through the inlet IN or particles would be illuminated within the jet stream to provide a spectacular display.

In addition to jet streams produced at the outlet of the embodiments may take any configuration.

Also, when a jet or stream of light-conducting liquid collides with a secondary jet or stream, which may or may not be light-conducting, turbulence at the site of impact of the jets may disturb the light-conducting properties of the primary jet, such that light may leave the primary jet, providing for a spectacular display. This effect is particular suitable in case of a light-conducting sheet of water that is hit by one or more secondary jets.

Figure 18:
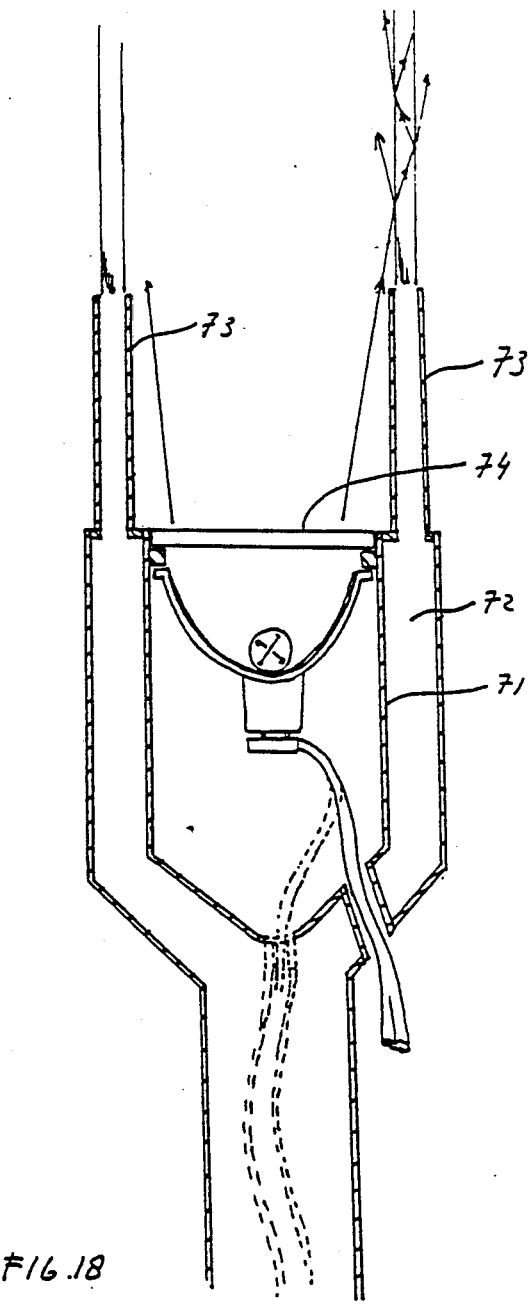
FIGS. 18 and 18a are a view of the fifteenth embodiment of the invention.

FIG. 18 illustrates another embodiment of the invention relating to a set of fountain nozzles 73 in which the lamp housing 71 is accommodated within an intermediate chamber 72, thus surrounded by and in heat exchange relationship with the water that flows to the nozzles 73. The water outlets 73 comprises a set of nozzles spaced around the circumference of a circle or is circular or part circular in configuration. The window 74 for the lamp housing is located in the central area defined by the outlet whereby the light therefrom is directed into the space surrounded by the jet stream from the nozzle and into the jet streams to be conducted thereby.

Moreover, in case of a number of more or less parallel arranged nozzles, light from said lightsource will also be directed to waterdrops falling from the top of the jets that are expelled from the nozzles 73. These drops, by their unstable and changing configuratios, may act as small mirrors by means of total internal reflection in the drops, such that an observer sees the lightsource (normally hidden from his view) via such moving drop over a certain distance, due to the fact that the drop is somewhere between lightsource and observer. The drops may well appear as sparks falling from the jets.

Figure 18A:
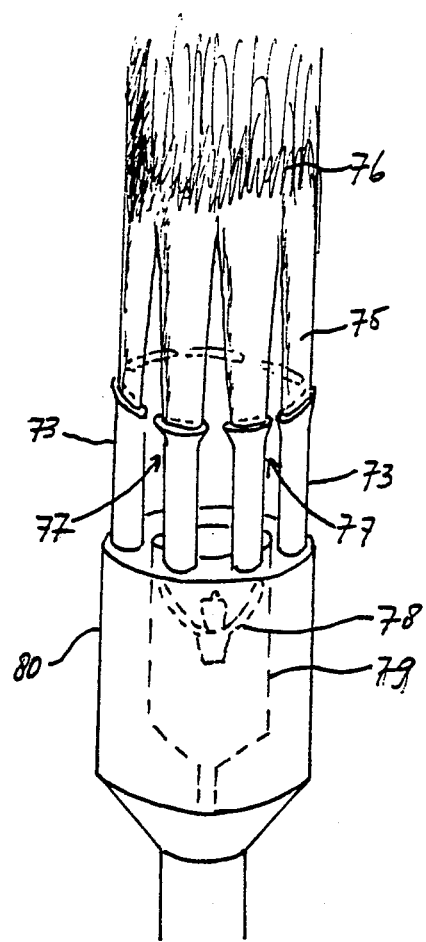

Alternatively, as is shown in FIG. 18a, the end of the nozzles 73 may be flattened in a manner that sheets 75 of water are expelled from the nozzles with the longitudinal axis of such sheets more or less tangent to the line along which the nozzles are arranged, such that these sheets will merge to form a hollow jet of water 76. Such hollow jet of water will not need a slot along its longitudinal axis, as in U.S. Pat. No. 3,866,832, in order to prevent collaps of the hollow jet, as the hollow of the watercolumn created by such merging jets is exposed to atmosphere via the spaces 77 between the seperate nozzles 73.

Thus, a hollow column of water 76 is created, which will conduct light emanating from lightsource 78, which lightsource is positioned in a housing 79 which is in heat-exchange relationship with the water passing through the housing 80 to the nozzles 73.

It should be appreciated that the scope of the invention need not be limited to the particular scope of the embodiments described above. For instance, the invention, as realised in a particular embodiment, may be used in beverage dispensers and cooling processes, where clear fluids are or can be used (e.g. a lathe, in cutting, grinding, polishing—processes), and light may be projected along with the cooling fluid to facilitate inspection. In addition, light of any wave length or color may be used in each of the embodiments discussed.

What is claimed is:

1. The method of creating a spectacular display by using a stream of liquid as a light guide, which comprises the steps of forming a solid elongate stream of substantially non-turbulent liquid medium having a first index of refraction into a medium which is ambient atmosphere having a second index of refraction lower than the first index of refraction to provide an outer boundary surface of the stream contacting the ambient atmosphere, introducing light into the stream closely adjacent the formation of the stream at its emergence into ambient atmosphere and in the direction of the liquid flowing in the stream so that light which enters the stream to strike the outer boundary surface at an angle of incidence greater than or equal to the critical angle for the media is guided within the stream by the phenomenon of total internal reflection of light in the stream, and creating the spectacular display by controlling the exit of light from the stream.

2. The method as defined in claim 1 wherein creation of the spectacular display is effected by air bubbles in the liquid.

3. The method as defined in claim 1 wherein creation of the spectacular display is effected by particulate material present in the liquid.

4. The method as defined in claim 1 in which the stream is formed by a faucet.

5. The method as defined in claim 1 wherein creation of the spectacular display is effected by creating turbulence in the stream.

6. The method as defined in claim 1 wherein the stream is of ribbon-like form.

7. The method as defined in claim 1 wherein the stream is directd downwardly to arch by gravity.

8. Apparatus for creating a spectacular display by using a stream of liquid as a light guide, which comprises the combination of means for forming a solid elongate stream of substantially non-turbulent liquid medium having a first index of refraction into a medium which is ambient atmosphere having a second index of refraction lower than the first index of refraction to provide an outer boundary surface of the stream contacting the ambient atmosphere, means for introducing light into the stream closely adjacent the formation of the stream at its emergence into ambient atmosphere and in the direction of the liquid flowing in the stream so that light which enters the stream to strike the outer boundary surface at an angle of incidence greater than or equal to the critical angle for the media is guided within the stream by the phenomenon of total internal reflection of light in the stream, and means for creating the spectacular display by controlling the exit of light from the stream.

9. Apparatus as defined in claim 8 wherein the means for forming comprises a conduit having a discharge opening through which the liquid is discharged, the means for introducing light comprising a light source.

10. Apparatus as defined in claim 9 wherein the means for introducing light also comprises light guide means for guiding light from the light source to the discharge opening.

11. Apparatus as defined in claim 9 wherein the means for introducing light also comprises means for reflecting light from the light source to the discharge opening.

* * * * *